US011665146B2

(12) United States Patent
Dharmarajan et al.

(10) Patent No.: US 11,665,146 B2
(45) Date of Patent: *May 30, 2023

(54) MIGRATING AUTHENTICATED CONTENT TOWARDS CONTENT CONSUMER

(71) Applicant: Microsoft Technology Licensing, LLC, Redmond, WA (US)

(72) Inventors: Baskaran Dharmarajan, Palo Alto, CA (US); Andy Chin, Sunnyvale, CA (US); Aladdin A. Nassar, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 747 days.

This patent is subject to a terminal disclaimer.

(21) Appl. No.: 16/560,097

(22) Filed: Sep. 4, 2019

(65) Prior Publication Data
US 2019/0394181 A1 Dec. 26, 2019

Related U.S. Application Data

(63) Continuation of application No. 15/290,927, filed on Oct. 11, 2016, now Pat. No. 10,412,065, which is a
(Continued)

(51) Int. Cl.
*H04L 9/40* (2022.01)
*G06F 16/955* (2019.01)
(Continued)

(52) U.S. Cl.
CPC ........ *H04L 63/061* (2013.01); *G06F 12/1408* (2013.01); *G06F 16/955* (2019.01);
(Continued)

(58) Field of Classification Search
CPC ..... H04L 67/2814; H04L 67/14; H04L 67/28; H04L 67/289; H04L 63/08; H04L 67/568;
(Continued)

(56) References Cited

U.S. PATENT DOCUMENTS 6,950,823 B2 * 9/2005 Amiri ............... G06F 16/24539
707/999.002
6,996,616 B1 * 2/2006 Leighton ........... H04L 29/12009
709/219
(Continued)

FOREIGN PATENT DOCUMENTS

CN 101005606 A 7/2007
CN 101471919 A 7/2009
(Continued)

OTHER PUBLICATIONS

"First Office Action and Search Report Issued in Chinese Patent Application No. 201711423378.2", dated Apr. 27, 2020, 10 Pages.
(Continued)

*Primary Examiner* — Tae K Kim
(74) *Attorney, Agent, or Firm* — NovoTechIP International PLLC

(57) ABSTRACT

Techniques involving migrating authenticated content on a network towards the consumer of the content. One representative technique includes a network node receiving an encrypted seed having at least a location of the user data at a network service that stores the user data, and a cryptographic key to access the user data. The seed is received in response to a user login attempt to the network service. The user data is requested from the location using at least the received cryptographic key. The method further includes receiving and storing the user data at the network node, where the network node is physically closer to a location of the user than is the location of the network service. If the user is successfully authenticated, user access is provided to the stored user data at the network node rather than from the network service.

20 Claims, 6 Drawing Sheets

Related U.S. Application Data continuation of application No. 14/477,765, filed on Sep. 4, 2014, now Pat. No. 9,509,666, which is a continuation of application No. 13/307,017, filed on Nov. 30, 2011, now Pat. No. 8,843,758.

(51) Int. Cl.

| | | |
|---|---|---|
| *H04L 12/64* | (2006.01) | |
| *H04L 67/563* | (2022.01) | |
| *H04L 67/5681* | (2022.01) | |
| *H04L 67/289* | (2022.01) | |
| *G06F 12/14* | (2006.01) | |
| *H04L 67/52* | (2022.01) | |

(52) U.S. Cl.
CPC ...... *H04L 12/6418* (2013.01); *H04L 63/0428* (2013.01); *H04L 63/062* (2013.01); *H04L 63/068* (2013.01); *H04L 63/0853* (2013.01); *H04L 67/289* (2013.01); *H04L 67/563* (2022.05); *H04L 67/5681* (2022.05); *G06F 2212/1052* (2013.01); *H04L 67/52* (2022.05)

(58) Field of Classification Search
CPC .. H04L 67/5681; H04L 67/5682; H04L 63/10
See application file for complete search history.

(56) References Cited

U.S. PATENT DOCUMENTS

| | | | | |
|---|---|---|---|---|
| 7,114,008 | B2* | 9/2006 | Jungck | H04L 47/10 712/201 |
| 7,197,566 | B1* | 3/2007 | Kuzma | H04L 65/4084 709/227 |
| 7,200,681 | B1* | 4/2007 | Lewin | H04L 67/28 709/246 |
| 7,240,100 | B1* | 7/2007 | Wein | H04L 65/1063 709/214 |
| 7,685,298 | B2* | 3/2010 | Day | H04L 67/142 709/227 |
| 7,900,040 | B2* | 3/2011 | Brendel | H04L 67/1002 713/153 |
| 7,930,402 | B2* | 4/2011 | Swildens | G06Q 40/00 709/219 |
| 7,941,609 | B2* | 5/2011 | Almog | H04L 67/5681 709/219 |
| 7,953,851 | B2* | 5/2011 | Britton | H04L 43/00 709/239 |
| 8,214,486 | B2* | 7/2012 | Britton | G06Q 30/0261 709/239 |
| 8,244,874 | B1* | 8/2012 | Thireault | H04L 41/0806 709/226 |
| 8,255,489 | B2* | 8/2012 | Afergan | H04L 67/303 709/219 |
| 8,307,088 | B2* | 11/2012 | Leighton | H04L 29/12009 709/219 |
| 8,504,655 | B1* | 8/2013 | Bertz | H04L 63/0281 709/219 |
| 8,805,950 | B1* | 8/2014 | Landsman | G06F 16/9574 709/213 |
| 2003/0046343 | A1* | 3/2003 | Krishnamurthy | H04L 67/303 707/E17.119 |
| 2004/0044731 | A1* | 3/2004 | Chen | H04L 67/02 709/203 |
| 2004/0187076 | A1* | 9/2004 | Ki | H04L 29/06 707/E17.115 |
| 2006/0168088 | A1* | 7/2006 | Leighton | H04L 67/1021 709/207 |
| 2007/0055765 | A1* | 3/2007 | Lisiecki | H04L 67/1097 709/223 |
| 2007/0089110 | A1* | 4/2007 | Li | H04L 67/2847 717/178 |
| 2007/0136794 | A1* | 6/2007 | Chin | H04L 63/0807 726/5 |
| 2007/0250560 | A1* | 10/2007 | Wein | H04L 61/1576 709/201 |
| 2008/0086524 | A1* | 4/2008 | Afergan | H04L 67/02 709/202 |
| 2008/0133712 | A1* | 6/2008 | Friedman | H04L 67/1027 709/218 |
| 2009/0029692 | A1* | 1/2009 | Radermacher | H04M 3/42348 455/418 |
| 2009/0113532 | A1* | 4/2009 | Lapidous | H04L 9/32 709/219 |
| 2009/0150518 | A1* | 6/2009 | Lewin | H04L 67/2842 709/219 |
| 2010/0036954 | A1* | 2/2010 | Sakata | H04L 67/1002 709/226 |
| 2011/0185041 | A1* | 7/2011 | Hunt | H04L 65/80 709/219 |
| 2012/0089700 | A1* | 4/2012 | Safruti | H04L 67/2842 709/217 |
| 2012/0198071 | A1* | 8/2012 | Black | H04L 67/16 709/226 |
| 2012/0311020 | A1* | 12/2012 | Brown | H04L 67/2852 709/203 |
| 2012/0324113 | A1* | 12/2012 | Prince | H04L 67/2814 709/226 |
| 2012/0324552 | A1* | 12/2012 | Padala | H04L 9/3213 726/6 |
| 2013/0035979 | A1* | 2/2013 | Tenbrock | G06Q 30/02 705/7.29 |
| 2013/0282849 | A1* | 10/2013 | Friedman | H04L 67/303 709/206 |

FOREIGN PATENT DOCUMENTS

| | | | | |
|---|---|---|---|---|
| CN | | 102130935 A | 7/2011 | |
| WO | WO-2006112845 A1 * | | 10/2006 | ......... G06F 16/9574 |

OTHER PUBLICATIONS

Tao, Huang, "P2P-Based Research and Implementation of CDN Streaming Media Flow Localization Technology", In Chinese Master's Theses Full-Text on Database-Information and Technology Edition, Sep. 15, 2011, 66 Pages.

* cited by examiner

MIGRATING AUTHENTICATED CONTENT TOWARDS CONTENT CONSUMER

RELATED APPLICATIONS

This application is a Continuation of and claims benefit from U.S. patent application Ser. No. 15/290,927 that was filed on Oct. 11, 2016, which is a Continuation of U.S. patent application Ser. No. 14/477,765 (U.S. Pat. No. 9,509,666), filed Sep. 4, 2014, which is a continuation of U.S. patent application Ser. No. 13/307,017 (U.S. Pat. No. 8,843,758), filed Nov. 30, 2011 (issued Sep. 23, 2014), each of which is incorporated herein by reference in its entirety.

BACKGROUND

The quantity of digital data available via networks is immense. Information may be obtained over networks ranging from peer-to-peer networks and local area networks, to global networks such as the Internet. Various types of information may be obtained, including data that is intended to be available to any user, as well as more personalized data such as electronic mail (email), backup data, etc. In many cases, users need to submit credentials to demonstrate that they are authorized to view and/or access certain content. For example, a user may be required to log on to a website to view or download information, log on to a mail server to receive email, etc.

With the ubiquity of accessible digital information, people have come to expect uninterrupted service and seemingly instantaneous access speeds. In addition to technology advances contributing to increased communication speeds, anticipatory techniques may also play a significant role in advancing network communication speeds. For instance, pre-fetching and other anticipatory techniques can make rational assumptions as to what a user might request next. Such decisions may be made on various factors, such as what content the user is currently consuming, known user preferences, past user behavior and/or any number of other factors.

These and other techniques are often possible because the particular user involved in the communication of the information is known. For example, email messages and message list pages could be pre-fetched where the particular user requesting his/her email is known to the mail server or other mail transfer agent. A particular user's typical past behavior could prompt certain information to be transmitted to a holding storage for quick user access, based on a probability that the user will indeed soon request that information. Such techniques can make data and other information requests appear to be nearly instantaneous, even though back end and/or transmission delays are in fact taking place without the user's knowledge.

However, these and other techniques may be based on information that is associated with, or in some cases unique to, the user. Where the user's identity is not yet known, a session has not been established, etc., such techniques may not be available. For example, while a user is logging onto a web-based service, no session has yet been established, and the identity and/or attributes associated with the user are not yet known to the service. While authentication or other initial activities are occurring, the user can only endure the delay and wait until the procedure completes. Authentication requests and other initial communications may involve multiple exchanges of information. The number of hops and round trip times for such exchanges can result in an undesirable "time to glass" (TTG) experience for the user.

SUMMARY

Techniques involving migrating authenticated content on a network towards the consumer of the content. One representative technique includes a network node receiving an encrypted seed having at least a location of the user data at a network service that stores the user data, and a cryptographic key to access the user data. The seed is received in response to a user login attempt to the network service. The user data is requested from the location using at least the received cryptographic key. The method further includes receiving and storing the user data at the network node, where the network node is physically closer to a location of the user than is the location of the network service. If the user is successfully authenticated, user access is provided to the stored user data at the network node rather than from the network service.

In another particular implementation of such a technique, a system is provided that includes a first storage at a first location configured to store authentication-based content. A second storage at a second location is provided, where the second location is in closer physical proximity to a requestor of the authentication-based content than the first location. A processor at the second location is configured to securely request at least a portion of the authentication-based content from the first storage for storing in the second storage while the requestor attempts to log onto a service hosted at the first location. The processor is further configured to facilitate secure access to the authentication-based content from the second storage, such as by the requestor.

Another representative implementation involves a method, or computer-readable media having stored instructions that are executable by a processor to perform functions. The method involves receiving a user access request at a web-based email service, and in response, generating an encrypted seed including a user identifier, a storage location of the user's email data at the email service, and a cryptographic key to access the user's email data. The user is redirected to an authentication module which presents a login page and an image tag within the login page, where the image tag includes the encrypted seed and an address of an edge server of a content distribution network. A request is received from the edge server for a first portion of the user's email data identified by at least the cryptographic key. The requested first portion of the user's email data is directed to the edge server, and the first portion of the user's email data is allowed to be provided to the user from the edge server rather than from the email service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In the following description, reference is made to the accompanying drawings that depict representative implementation examples. It is to be understood that other embodiments and implementations may be utilized, as structural and/or operational changes may be made without departing from the scope of the disclosure.

As noted above, network access delays can often be reduced by using pre-fetching or other anticipatory techniques. Such techniques involve reasonable assumptions as to what the user might request, and actions can be initiated to obtain the information that is likely to be requested by a user. However, such techniques are ineffective where the user's identity is not yet known, a session has not yet been established, or in connection with some other initial activity. For example, until a user has "logged on" or otherwise been authenticated in connection with an application or service, no authenticated content can be presented to the user, as the user has not yet been authorized to view it. Thus, while such authentication or other initial processes are taking place, the user may experience an undesirable delay until relevant content is presented.

The disclosure is generally directed to making authentication-based content at least temporarily available to the content consumer, or "user," at a location physically closer to the user than where the content is normally stored. A network application/service can generate an encrypted token in response to a user's request to access the service. The token can be provided to the user directly, via a redirected authentication module, etc. Using the token, the user can make a request to a network node in closer proximity than the network service, where the request causes the closer network node to obtain at least the first presentable portion of the authentication-based content from the more distant network service. This transaction of requesting and providing the authentication-based content to the nearer network node may be done while the user is logging into the network service, thereby enabling transmission delays to occur at a time when the user would not otherwise expect to be presented with the content. When the user is ultimately authenticated, the first presentable portion of the authentication-based content that has been cached at the nearer network node can quickly be provided to the user. TTG is improved at least due to the parallel acquisition of the user data, and the closer proximity of the data when the user is eventually authenticated.

Figure 1A:
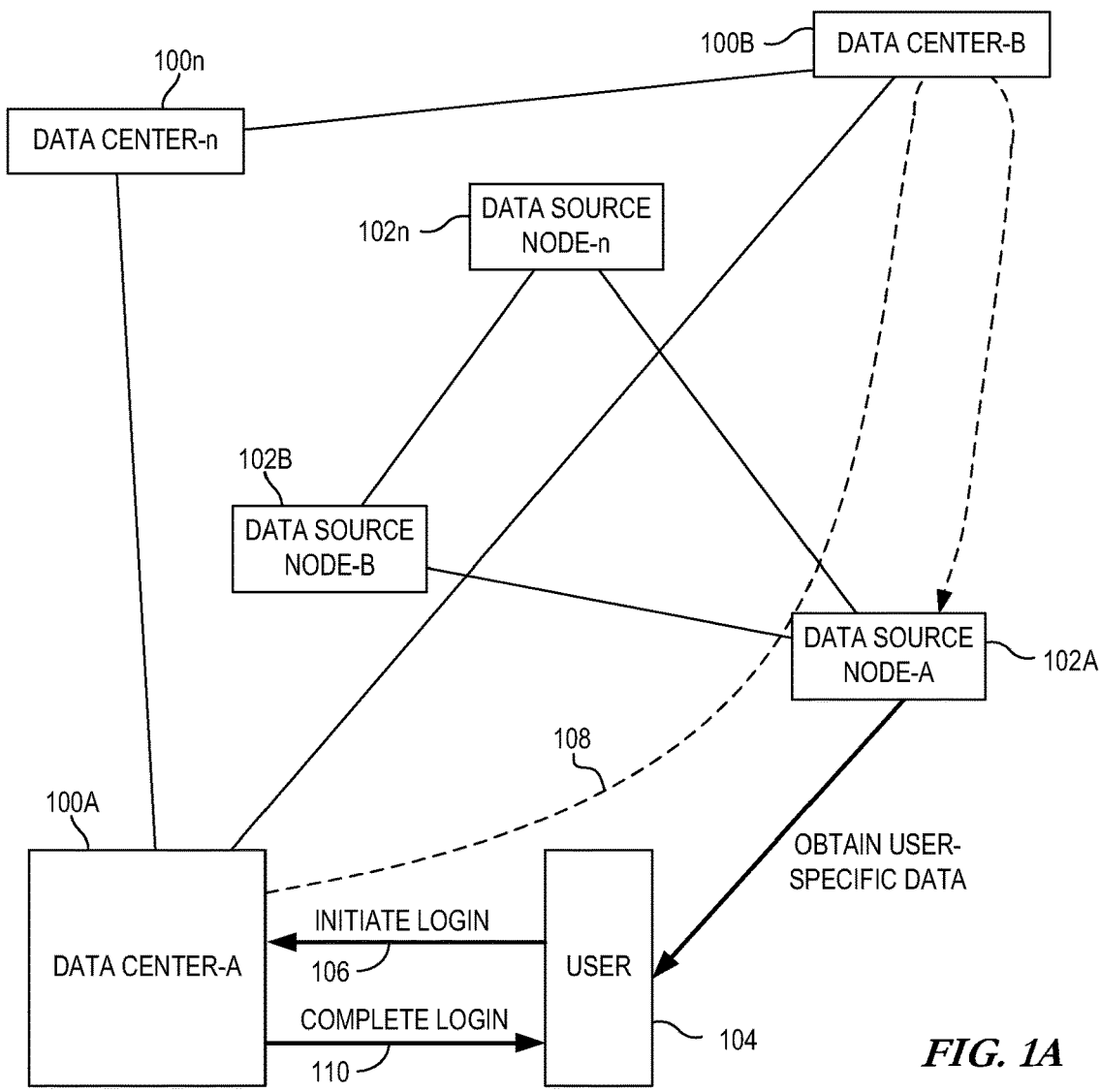
FIG. 1A is a representative networking environment illustrating a representative manner in which the techniques described herein may be implemented.

Referring now to FIG. 1A, a representative networking environment is described that illustrates a representative manner in which the techniques described herein may be implemented. In the illustrated example, a network-based application, service, or other network entity may have data distributed at various points on the network as depicted by data centers 100A, 100B, 100n, etc. For purposes of example, these data centers 100A, 100B, 100n may include data storage entities associated with the network-based services. Other network entities such as data source node-A 102A, data source node-B 102B, data source node-n 102n may be associated with the same or different network than the data centers 100A, 100B, 100n. In one example, the data source nodes 102A, 102B, 102n represent content storage entities that provide digital content by way of, for example, a content distribution network (CDN). In another example, at least the data source node-A 102A is a third-party network node relative to the data centers 100A, 100B, 100n, where data security measures taken at the data centers 100A-100n are not generally carried over to the data source nodes 102A-102n.

A user 104 may interact with any one or more of the illustrated network entities. A representative technique described herein reduces the delay confronting the user 104 upon initial interaction with one or more of the network entities. For example, the initial interaction may be a login process, where the user enters user-specific credentials in order to gain access to network services, data, etc.

In a more particular example, it is assumed that the user 104 has initiated a login process as depicted by interaction line 106. Embodiments described herein set forth manners in which the time-to-glass (TTG) from the user's login initiation is reduced by caching or otherwise storing user-related information at a network entity closer to the user than its original storage location. For example, when the user 104 initiates the login depicted on line 106, the user 104 might enter an email address and/or user identifier (user ID), password, etc. Once submitted by the user 104, the user typically waits until the credentials have been authenticated, and the application/service is ultimately presented to the user 104. In accordance with the techniques described herein, the user's wait time is reduced by storing a first page(s) of the application/service being accessed in a node physically closer to the user 104, so that it is more quickly presented to the user 104 when the login process has been completed.

Thus, content or data that is typically private to the user can be retrieved from a storage area while the user is logging in or otherwise occupied in an initial interaction. During these parallel actions, the content may be moved to a location geographically closer to the user, in anticipation of the login process culminating in the user's successful authentication. It should be noted that unless otherwise noted, references to events occurring "in parallel," "contemporaneously," or the like do not suggest that such events overlap in time precisely, but rather than they overlap to at least some degree.

In the example of FIG. 1A, a user data caching operation is initiated when the user 104 has initiated the login process as depicted by interaction line 106. The user data caching operation is depicted by the dashed line 108, where user-identifying information is securely provided to the data center-B 100B in this example. The user-identifying information is used to identify user-specific information stored at the data center-B 100B, such as initial web content that may be presented to the user 104 when the login procedure is complete. Such user-specific information may be provided from the more distant data center-B 100B to a data source node-A 102A or other node accessible to the data center-B 100B. When the user 104 has completed the login as depicted by interaction line 110, the user-specific information can be more quickly provided to the user 104, at least in part to its closer proximity at data source node-A 102A.

Figure 1B:
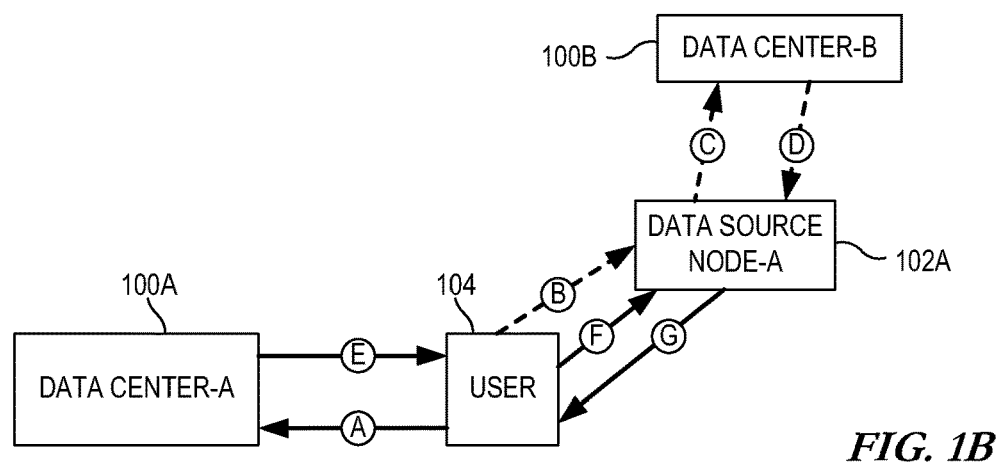
FIG. 1B depicts a more particular example of interactions that may be used to make user-specific information available nearer to a user to reduce delays and improve time-to-glass.

FIG. 1B depicts a more particular example of interactions that might be used to make user-specific information available nearer to a user to reduce delays and improve TTG. This example involves items referenced in FIG. 1A, and thus uses like reference numbers where appropriate. In this example, it is assumed that the user 104 accesses a website or other network node to interact with the data center-A 100A, as shown by line A. In manners described in more particular embodiments below, a browser (not shown) associated with the user 104 ultimately provides secure information to a node nearer to the user 104 than the data center-B 100B where user-specific information is stored. The data source node-A 102A represents such a "nearer node" relative to the user 104, and dashed line B represents the transfer of the secure information.

Using this secure information depicted by dashed line B, the node-A 102A makes a request for the user-specific information stored at the data center-B 100B, as depicted by dashed line C. The user-specific information is provided from data center-B 100B to the data source node-A 102A to be at least temporarily stored. If the user's login is ultimately successful, the data center-A 100A (which may include or be associated with an authentication node) can generate a page(s) for the user 104 as depicted by line E, thereby causing the user's 104 browser to access the temporarily stored information at data source node-A 102A, as depicted by lines F and G.

Thus, among other things, the techniques described herein enable authenticated content specific to at least one user to be pushed towards the edge of the network from a more distant data center. For example, authentication or "login" procedures may be accelerated by pushing the authenticated data closer to the user. In one embodiment, the data is pushed to servers that do not normally store data that involves authentication in order to obtain it. For example, the authenticated content may represent content that would not otherwise be distributed to any general requestor, such as the first page of web content that would be presented to the user when the user's credentials have been authenticated. In a more particular example, the authenticated content may be the first page of a user's home page, web-based email inbox, etc. In one embodiment, the authenticated content is acquired and at least temporarily stored at a secondary server(s), such as an edge server or other intermediary server, that is closer to the client device than it would otherwise be stored. The authenticated content may be obtained for caching/storing at the nearer server while the user is presented with a manner of entering authentication credentials. In this manner, the overlap in time between caching the authenticated content and entering the user's credentials is time saved in the overall login process. More particularly, when the user has completed entering his/her credentials, the authenticated content need not be obtained from a distant node, but rather will be readily available at a node nearer to the user, such as a CDN edge server.

Figure 2:
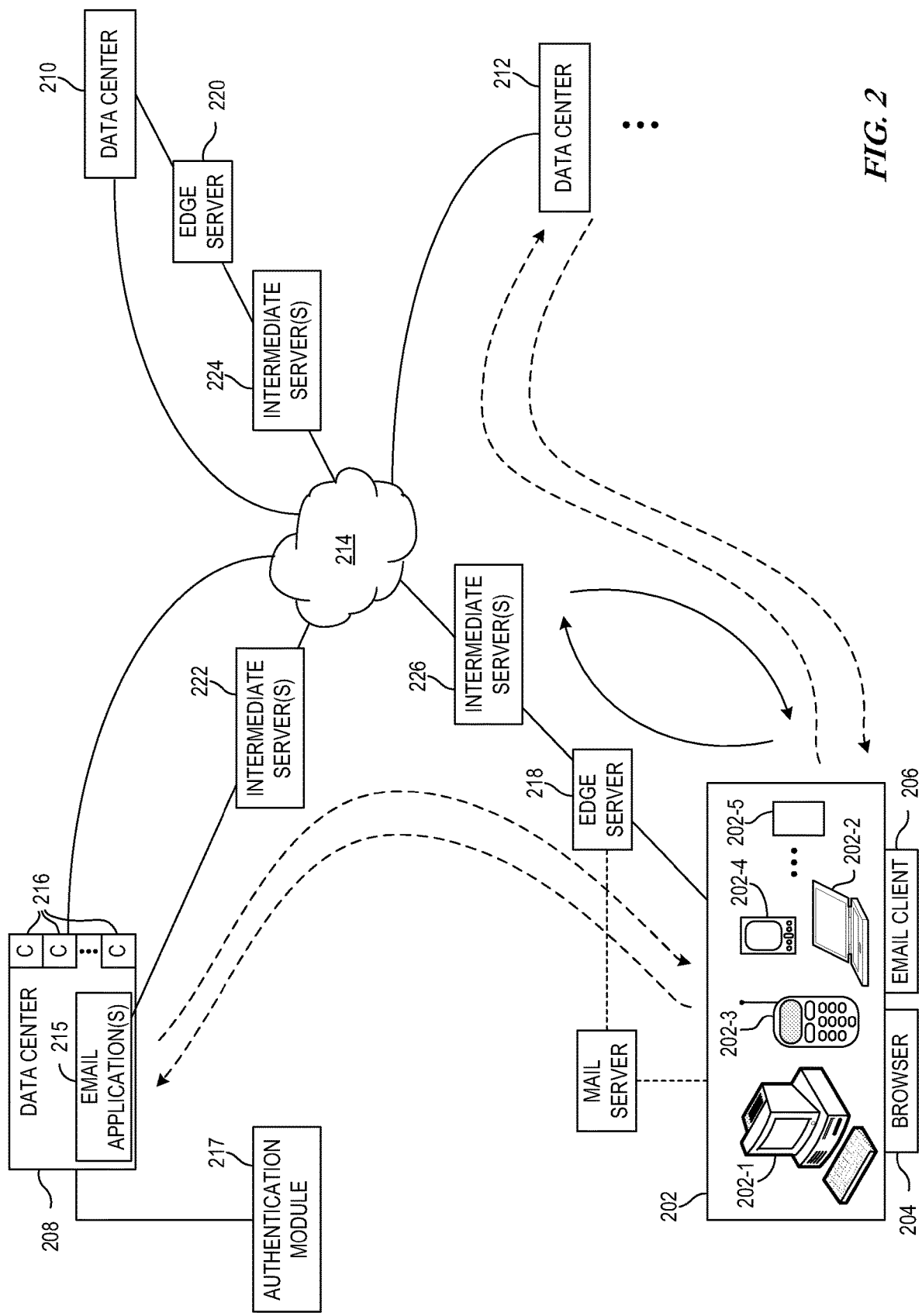
FIG. 2 illustrates a representative system-level example for reducing delays associated with obtaining user-specific information.

FIG. 2 illustrates another representative example for reducing delays associated with obtaining user-specific information. In the example of FIG. 2, the service provided via the network is assumed to be an Internet-based electronic mail (email) service, where the TTG is reduced when the user logs on to access his/her email.

In the example of FIG. 2, a number of representative apparatuses or devices 202 are depicted that a user might use to access email and/or other network services. The devices 202 are illustrated for purposes of example, and does not represent an exhaustive list. The techniques described herein are applicable to any device that may communicate with or otherwise access services and/or data via one or more networks. The devices 202 may be stand-alone computing devices, portable computing and/or communication devices, devices embedded into other products such as appliances or automobiles, etc. The representative devices 202 include a desktop computer 202-1, portable computer (e.g. laptop) 202-2, mobile phone 202-3, personal digital assistant 202-4, or other 202-5 device capable of communicating via a network(s). Where at least one network service utilized by the device 202 is email, the device 202 may include software such as a browser 204 to access web-based mail, a local email client 206, etc.

The representative embodiment of FIG. 2 includes one or more data centers 208, 210, 212 that are available via the network 214. The data centers 208, 210, 212 may be geographically distributed around serviced portions of the globe. In one embodiment, data centers include clusters, such as the clusters 216 shown at data center 208. Email and/or other data for the user of the device 202 may be stored at a particular cluster 216 and data center 208. Thus, when a user accesses a uniform resource locator (URL) or other address to reach a web-based email application 215, the user may be interacting with that particular data center 208.

When the user is directed to the email application 215, the user's browser 204 is, in one embodiment, redirected to an authentication module 217 that may be associated with the data center 208 or separate therefrom. The authentication module 217 facilitates user entry of user credentials, such as an email address and/or username, password, etc. When that information is verified by the authentication module 217, the browser 204 may be redirected back to the email application 215. In accordance with techniques described herein, web content, such as a screen showing the user's email inbox that will be presented to the device 202, is cached at a network entity geographically closer to the device 202 than the data center 208 from which the web content/data is served. The content can be obtained and moved to the closer network entity, such as the edge server 218, when the user's credentials are being entered and/or verified.

For example, the network 214 may include a content distribution network (CDN) that includes one or more edge servers 218, 220, and in some cases one or more additional intermediate servers 222, 224, 226 that may be associated with any part of the email system, CDN and/or other system. The user of the device 202 may point the browser 204 to the service provided by the email application 215, and begin the login process. During this time, user-specific data may be moved from the appropriate cluster 216 at the data center 208 to a network node closer to the device 202, such as the CDN edge server 218. While the CDN edge server 218 may generally be used to store content not requiring authentication such as general images, javascript code, cascading style sheets (CSS), etc., techniques described herein exploit the proximity of the edge server 218 to securely cache authentication-based, user-specific data. By utilizing appropriate security measures, the user-specific data may be cached at the edge server 218 with protection against unauthorized access.

In one embodiment, the user-specific data includes the first page of the email service that will be presented to the user, such as the user's personal email inbox. A first page to be presented on a user's device 202 will differ from user to user, as the email inbox or other content will generally be unique to each user. When the user's credentials have been verified, the browser 204 can obtain, or be instructed to obtain, the cached user-specific content from the physically proximate edge server 218. The email content may be presented via the browser 204, managed by a mail server 230 and presented via a local email client 206, etc. By caching the user-specific content physically closer to the device 202, the time expended to present the first page of the requested content can be reduced. Manners of securing the user-specific data to enable a faster TTG while maintaining user privacy are described below.

Figure 3:
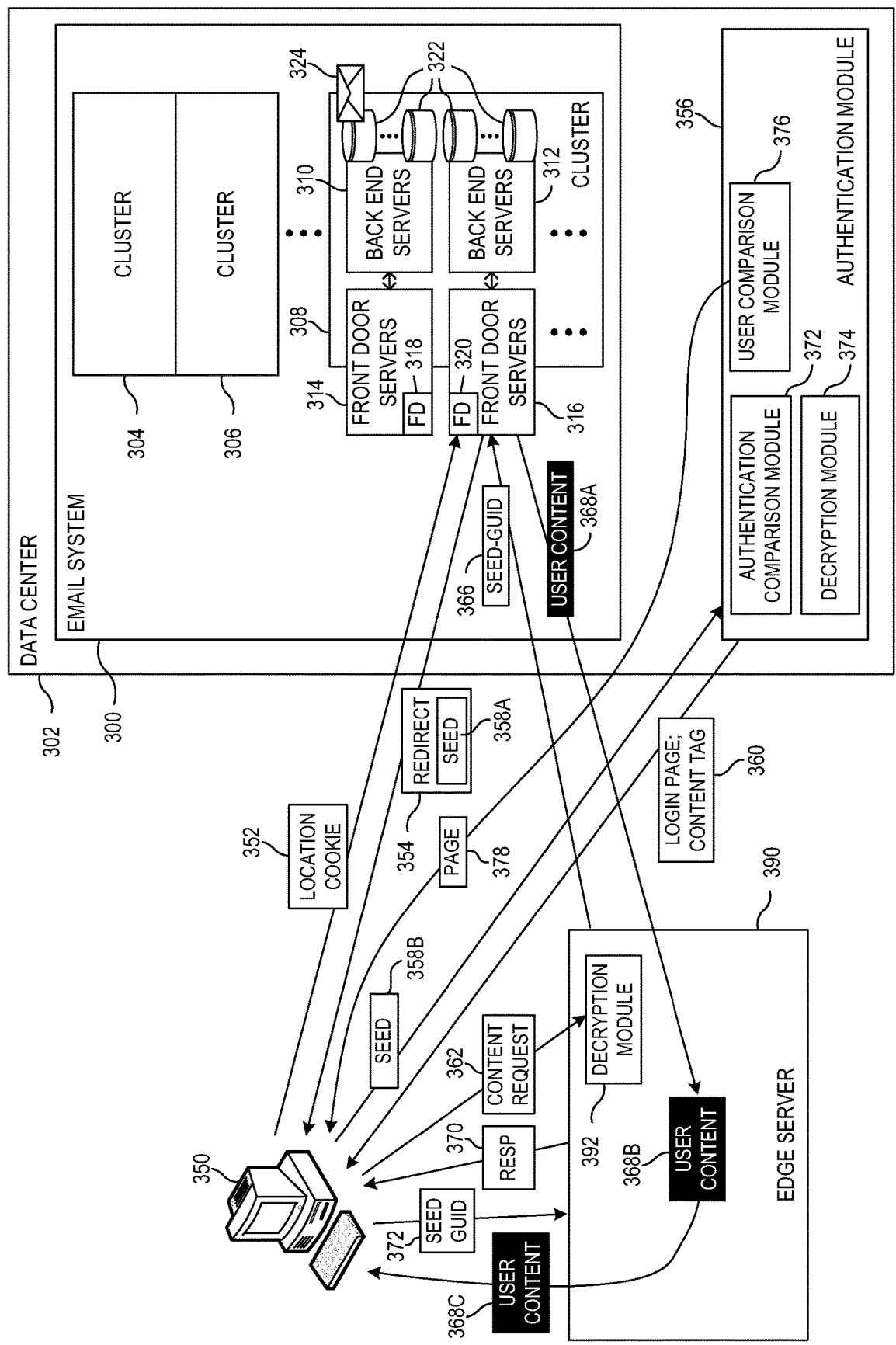
FIG. 3 illustrates a representative example for reducing delays associated with a login process of a web-based email program.

FIG. 3 illustrates a representative example for reducing delays associated with a login process of a web-based email program. In the illustrated embodiment, it is assumed that an email system 300 is distributed among one or more data centers 302. While various implementations are possible in connection with the techniques described herein, the illustrated embodiment involves a plurality of clusters 304, 306 through 308, each of which hosts multiple users, and in many cases a large number of users. Each cluster, such as cluster 308, may represent a self-contained set of servers including one or more backend servers 310, 312 and one or more frontend servers 314, 316. The frontend servers 314, 316 interface to the external devices such as client device 350, and may perform functions such as formatting pages, checking for viruses, etc. The frontend servers 314, 316 may include front door (FD) servers 318, 320 that can engage in the first contact with client devices 350 that utilize the email system 300. The FD servers 318, 320 can make requests to the backend servers 310, 312 on behalf of the client devices 350.

Among other things, the backend servers 310, 312 may provide databases and/or other storage 322 to store user data, including users' email 324 and other user-specific content. In one embodiment, the user-specific content stored in storage 322 at any of the one or more data centers 302 includes one or more web pages that will be presented to the user upon successful login, such as a home page of the email service, an inbox of the email service, etc. It should be noted that the particular distribution of duties between the representative frontend servers 318, 320 and backend servers 310, 312 is described for purposes of illustration only, as the techniques described herein are applicable regardless of the distribution of duties between a plurality of servers, or whether there are multiple servers at all.

As noted above, the example of FIG. 3 is described in the context of an email system 300. In this embodiment, it is assumed that the client device 350 as previously communicated with the email system 300, and at least one cookie 352 is stored at the client device 350. The cookie 352 may be, for example, data identifying the user, and suggesting where the users data resides. For example, the location cookie 352 may be stored at the client device 350 that includes data identifying which cluster 304, 306, 308, etc. and perhaps which data center 302 the user's email data resides.

As described in greater detail below, such a location cookie 352 can provide information sufficiently identifying the user such that an encrypted token or "seed" can be generated for that user. A location cookie 352 is not required in connection with the techniques described herein, as other identifying information may be used. For example, an email address may sufficiently identify the user to initiate retrieval and nearer caching of user-specific content. However, the use of a cookie 352 or other stored information may enable the creation of the seed and ultimate caching of the user-specific content sooner than if a user first submits an email address or other identifying information. It should also be noted that in one embodiment, the use of a location cookie 352 that stores at least a location (e.g. cluster 304, 306, 308, etc.) of the user's email data assumes the user's data remains in the same cluster, or at least has not changed since the last email access. In this manner, the location cookie 352 can quickly provide the location in which the user's email data is known to be stored.

In other embodiments, other information identifying a user can then be used to identify the location of the user's data, which in some cases may involve an extra step of locating the user's personal email data. Various embodiments involve various levels of detail of user identification information and/or user data location information, any of which is feasible in connection with the description herein, although in some cases the exact location of the user data may be located with the assistance of other identifying information rather by way of direct location information (e.g. a cluster address). Thus, while the embodiment of FIG. 3 is described in connection with a location cookie 352 that identifies the user as well as a location of the user's stored email data and other user-specific content, other identifying information may alternatively be used without departing from the techniques described herein.

In one embodiment, the seed 358A generated at the data center 302 in response to the location cookie 352, or other user identification information, represents a preauthorization bundle in the form of an encrypted token. This encrypted token or "seed" may include information such as a value that uniquely identifies the respective user to the email system 300 and authentication module 356, which may be referred to herein as a client identifier (CID). As previously noted, the seed may also include the location of the user's email and related data, such as the user's email cluster name, address or other cluster identifier. In one embodiment, a cryptographically safe random number is also provided as part of the seed, which may be referred to herein as a preauthorization key, or seed-GUID (globally unique identifier). The seed-GUID may be used as a key to access the appropriate data for the user identified by the CID at the identified cluster, such as the user's email inbox.

More particularly, the client device 350 may provide a location cookie 352 or other user-identifying information to the email system 300. In one embodiment, the location cookie 352 is in the form of a user identification cookie (UIC) that includes at least an identification of the user and a location of the user's data cluster. The location cookie 352 may be encrypted. A front door server 320 receives the location cookie 352, and in one embodiment responds with a redirect message 354 to an authentication module 356, as well as the seed 358A generated from the user information in the location cookie 352. In this example, the seed 358A represents the encrypted structure including at least the cluster, seed-GUID, and CID, which are referred to herein as a triplet.

The client device's 350 browser follows the redirect message 354 link to the authentication module 356 which in response provides a login page 360. The seed 358B may be provided to the authentication module 356 for subsequent use. In accordance with one embodiment, the login page 360 includes, among other things, a content tag such as an image tag. The content tag is provided as part of the custom content rendered for the email system 300 by the authentication module 356 on the login page 360. An example of such an image tag is shown below:

```
<img src=https://CDN.emailname.com/clear.gif?s=<encrypted>"/>
```

Example 1 where "CDN" in this example represents a content distribution network edge server 390, CDN.emailname.com thus represents a CDN edge server 390 that collaborates with the mail system (emailname.com) 300.

As a result, during the time that the user of the client device 350 may be typing in his/her credentials, the client device's 350 browser may make a content request 362 to this URL of the edge server 390 in parallel. The content request 362 points to edge server 390, which triggers the call to start caching the user-specific data. It should be noted that the edge server 390 may be any network node physically closer to the client device 350 that can collaborate with the email system 300. In the illustrated embodiment, this network node is represented by a CDN edge server 390, although it need not be. In one embodiment, however, the network node to which user-specific content is cached is a network node that might not otherwise involve authentication requirements to receive content.

Using the URL of Example 1 above, the client device's 350 browser would make a content request 362 for an image tag at CDN.emailname.com with the encrypted seed. As is described in greater detail below, the content request 362 serves as a manner of providing the encrypted seed to the edge server 390, so that it can in turn obtain and cache the user-specific content (e.g. first web page of email service).

It should be noted that the login page 360 may include scripting language or other programming, rather than an image or other content tag, to trigger a request to the edge server 390. The use of image tags and other content tags represents one manner of assisting with the storing of the content on an edge server 390 or other intermediary node. However, analogous results may be obtained using other tags, or script, etc. For example, the use of a content tag could be replaced with an AJAX call (Asynchronous JAVASCRIPT™ and XML). In one embodiment such a call may also allow a larger quantity of authentication information to be posted if desired, as some image URLs may be implemented with request methods that are character-limited. User content 368B may, therefore, be pre-cached or otherwise stored on an edge server 390 by passing the encrypted seed and other related information using, for example, an IMG, IFRAME, SCRIPT or other similar HTML tags or other programming tags, or by using script with a device such as the XML HTTP request, etc. These and other analogous manners of passing the information may be used, and those described herein are provided for purposes of illustration.

It should be noted that the actual image, content or other data allegedly requested by the content request is not relevant. In one embodiment, the request for content is a guise to facilitate a client-initiated request by the edge server 390 to the appropriate cluster 308 to obtain the user-specific information, such as the user's first web page presented by the email system 300. In a more particular example assuming an image request, an imperceivable image may be obtained in response to the request, such as a one pixel by one pixel image that is transparent and/or too small to see. Alternatively, the image or other content request may return a perceivable image, sound, etc. However, in one embodiment, the image request is not actually seeking the resulting image, but rather using the image tag as a vehicle for providing the encrypted seed to the edge server 390 that will collaborate with the email system 300 to cache at least some of the user's authenticated information. This information caching occurs while the user is entering login credentials, thereby enabling faster presentation of the first page of the email service since it is cached physically closer to the client device 350.

To facilitate decryption of the seed and/or other information involving encrypted information, a digital certificate for the domain created for the edge server 390, such as CDN.emailname.com, is shared with the edge server 390 and/or the CDN to which the edge server 390 is associated. Additionally, the email system 300, authentication module 356 and CDN edge server 390 share a key referred to herein as the seed-key that is used to encrypt at least the seed. The seed-key may be, for example, a symmetric key. Alternatively, the seed-key may be a private key corresponding to the digital certificate. Other manners of encrypting the seed may be utilized.

When the edge server 390 receives the content request 362, it may decrypt the encrypted seed at the decryption module 392 using the seed-key that was previously shared with it. The edge server 390 will therefore have access to the cluster, seed-GUID and CID, and may post the seed-GUID 366 to the cluster provided in the decrypted seed (e.g. https://clustername.emailname.com/). The front end server 316 of the email system 300 provides the seed-GUID 366 to the backend server 312 to obtain the user-specific content from the storage 322. For example, the stored information may be the inbox page or other "home" content per user preference for the user's email. The email system 300 releases or otherwise provides this user-specific content 368A to the edge server 390 where it is at least temporarily stored until the user has successfully logged onto the email system 300 by way of the authentication module 356.

In one embodiment, the user content 368B stored at the edge server 390 has an expiration time. In response to receiving the content request 362, or in response to receiving the user content 368B, or any time therebetween, the edge server 390 can provide a response 370 to the original content request 362. As noted above, the response may be a small, substantially imperceivable image or other content that is not itself made use of at the client device 350. In one embodiment, the response 370 may be a small image sent asynchronously in parallel during the time the seed is decrypted at the decryption module 392 and during receipt of the user content 368B. At this point, the user content 368B is cached at the edge server 390, awaiting a successful login by the user, at which time the user content 368B may be provided to the client device 350.

At some point, the user finishes typing in his/her credentials via the login page 360 presented on the client device 350. The authentication module 356 provides an authentication comparison module 372 to compare the user's login credentials to stored login information. Upon successful authentication, the decryption module 374 decrypts the seed to get the user's cluster, seed-GUID and CID. The user comparison module 376 compares the decrypted CID to the credentialed user. If there is a match, the authentication module 356 generates a page 378. The page 378 may include scripting language (e.g. JAVASCRIPT™) or other code that causes the browser at the client device 350 to post the seed-GUID 372 to the location of the cached user content 368B at the nearer edge server 390.

In response to the request from the user device 350 associated with providing the seed-GUID 372, the edge server 390 serves the user content 368B that it cached earlier, as depicted by the user content 368C being provided to the client device 350. If the content is not found or has expired, the edge server 390 can simply pass through the post to the email system 300 for default processing.

In this manner, the user can receive user content 368C more quickly upon successfully logging into the email system 300 (or other network-based service). The user content represents user-specific content that, in one embodiment, is distributed only in response to the transfer of the preauthorization bundle or "seed" to enable the various entities to manage the caching of the user content.

The techniques described herein may be extended to multiple users of the client device 350 by making the seed be a list of triplets rather than a single item. For example, for two users, the seed may be a list of two triplets, each including the cluster, seed-GUID, and CID of the respective user of the client device 350. In such case, the logic where the user-specific information is cached (e.g. edge server 390) may perform the decrypting of the content request 362 and caching of the user content 368B for each of the triplets inside the seed. Further, the authentication module 356 can select the triplet from the decrypted seed that matches the CID value of the currently authenticating user.

Figure 4:
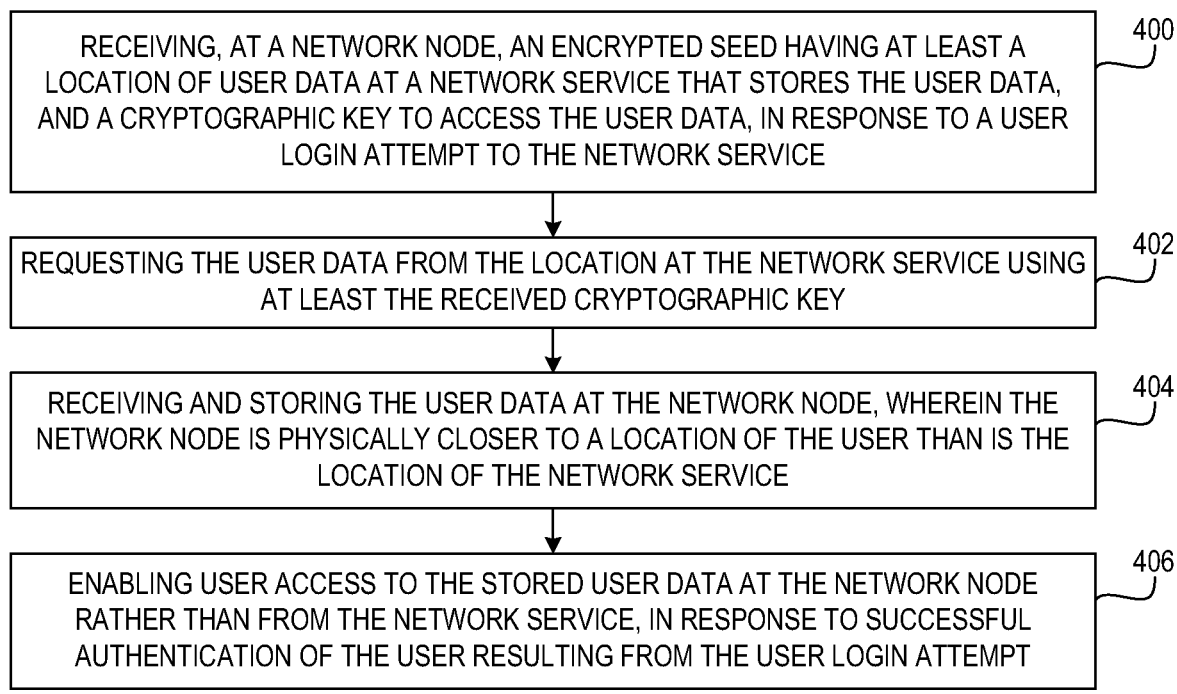
FIG. 4 is a flow diagram illustrating a representative method in which a network node can serve as a caching element to decrease latencies experienced by users during initial access to a network service.

The particular embodiment of FIG. 3 is presented for purposes of illustration, as the techniques described herein may be utilized in a variety of other contexts. For example, the techniques may be provided in connection with any network application/service, and any collaborative network node that may serve as an intermediary node between the user device and the network service. FIG. 4 is a flow diagram illustrating a representative method in which a network node can serve as a caching element to decrease latencies experienced by users during initial access to a network service. At block 400, a network node receives an encrypted seed that includes a location of the user data at the network service that stores the user data, as well as a cryptographic key that enables access to the user data. In one embodiment, the network node receives at least the encrypted seed in response to the user's login attempt to the network service.

As shown at block 402, the network node may request user's data location provided in the encrypted seed using at least the received cryptographic key. In response, block 404 shows that the network node can receive and store the user data that is normally stored at the network service, where this network node is located physically closer to the user than is the location of the network service. At block 406, user access is enabled to the stored user data at the network node rather than from the network service, in response to successful authentication of the user resulting from the user login attempt.

Figure 5:
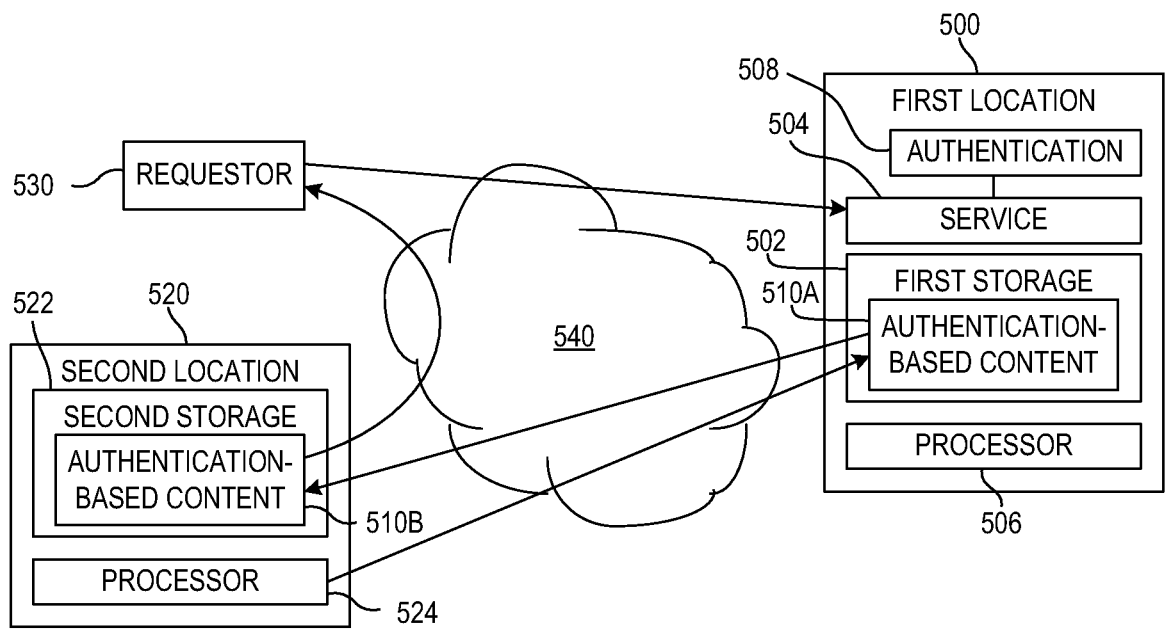
FIG. 5 is a block diagram of a system for retrieving user data while the user is logging on to a service that provides the user data, and for caching the user data at a location from which the user can more quickly obtain it.

Similarly, FIG. 5 is a block diagram of a system for retrieving user data while the user is logging on to a service that provides the user data, and for caching the user data at a location from which the user can more quickly obtain it. This embodiment illustrates a first storage 502 at a first location 500. The first location 500 may host, for example, an email service or other web-based service 504. The first storage 502 is configured to store authentication-based content 510A, such as a user email inbox or other user sensitive data. The first location 500 may include a processor(s) and/or other circuitry to perform the processing for the service 504, authentication 508 and/or other processes carried out of the first location 500.

A second storage 522 at a second location 520 is provided that is an closer physical proximity to a requestor 530 of the authentication-based content 510A than is the first location 500. The second location 520 may represent a node accessible on the network 540 that is capable of communicating with both the first location 500 and the requestor 530. In one embodiment, the processor 524 at the second location 520 is configured to securely request at least a portion of the authentication-based content 510A from the first storage 502 for storing in the second storage 522 while the requestor 530 attempts to log into the service 504 hosted at the first location 500. The login process may be performed by the processor 506 and/or the authentication module 508, which may or may not be located at the first location 500. The processor 524 is also configured to facilitate secure access to the authentication-based content 510B from the second storage 522.

Figure 6:
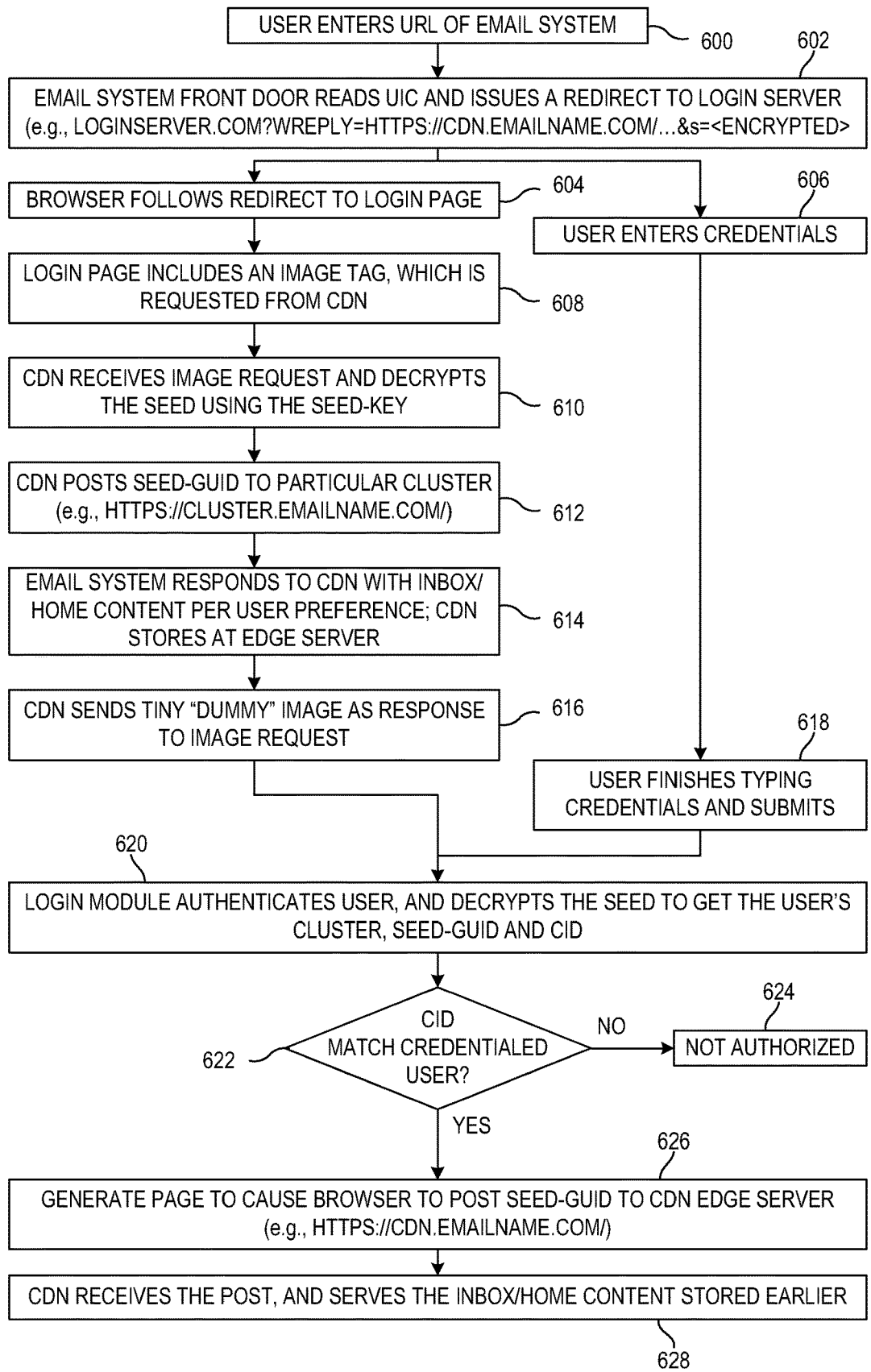
FIG. 6 is a flow diagram of one representative example of a manner of moving at least a portion of a user's email data to an edge server of a CDN that is geographically closer to the user than the email system is.

FIG. 6 is a flow diagram of one representative example of a manner of moving at least a portion of a user's email data to an edge server of a CDN that is geographically closer to the user than the email system is. In the illustrated example, the user enters a URL or other address of the email system 600. For example, the user could enter "emailname.com" into the address bar of his/her browser. In one embodiment, the email system front door reads a cookie, referred to herein as a user identification cookie (UIC), as shown at block 602. The UIC includes at least an identification of the user and where the users data is stored. Additionally, the email system issues a redirect to a login server, also depicted at block 602. An example of such a redirect is depicted in Example 2 below:

loginserver.com?wreply=https://CDN.emailname.com/ . . . &s=<encrypted>

Example 2

In Example 2, the "s" stands for "seed" and is the encrypted structure containing at least the data cluster name, seed-GUID and CID. As shown at block 604, the user's browser follows the redirect to a login page. By way of this login page, the user can enter his/her credentials as shown at block 606. Such credentials may include, for example, email address and/or username, password, etc. while the user is entering such credentials, other actions are taken into obtain a portion of the user's data and cache that data at a CDN edge server closer to the user. In one embodiment, this is initiated from the login page that includes an image tag as shown at block 608. In one example, the image tag may have a source as part of the custom content currently rendered for the email system by the authentication module on the login page. Such an example was shown in Example 1 above. As a result, while the user is typing his/her credentials at block 606, the browser makes the request to the URL of Example 1 in parallel.

As shown at block 610, the CDN receives the image request, and decrypts the seed using the seed-key. Block 612 shows that the CDN posts the seed-GUID to the particular cluster identified in the seed, such as that shown in example 3 below:

https://cluster.emailname.com/

Example 3

At block 614, the email system response to the CDN with the first page of the user's inbox, home content, or other first page by default, user preference, etc. Further, block 614 shows that the CDN stores this content at a CDN edge server or other server closer to the user than the email system is. The CDN does not yet forward the content to the user, as the user is still authenticating. In one embodiment, the content may have an expiration time, such as one minute, five minutes, etc., although other embodiments do not include such an expiration time.

As noted at block 610, the CDN received an image request which served as a vehicle for the user to reach the CDN and provide the seed. At block 616, the CDN may return an image as a response to this image request. In one embodiment, the image is not actually sought, and thus the requested image is a "dummy" image that is not used by the browser when the image is returned to it. This is shown at block 616. For example, the requested image may be a very small and/or transparent image that will have little or no impact on the user's browser display.

At some point, the user finishes entering his/her credentials, and submits them as depicted at block 618. As shown at block 620, the login module authenticates the user, and decrypts the seed to get the user's cluster, seed-GUID, and CID. If the CID does not match the credentialed user is determined at block 622, the user is not authorized as shown at block 624. On the other hand, if the CID matches the credentialed user as determined at block 622, block 626 shows that the login module can generate a page with, for example, script language that causes the browser to post the seed-GUID to the CDN edge server (at, for example, https://CDN.emailname.com/). The CDN receives that post from the user to serve the content (e.g. inbox, home page, etc.) that the CDN had cached earlier, as shown at block 628. If the content has expired or is not found, the CDN may pass the post through to the email system for normal handling.

In one embodiment, the security of the scheme involves serving the email data over secure sockets layer (SSL) so that the seed-GUID never travels in the clear. Further, the scheme can be extended to multiple users by making the seed into a list of triplets (cluster, seed-GUID, CID) rather than a single triplet.

Figure 7:
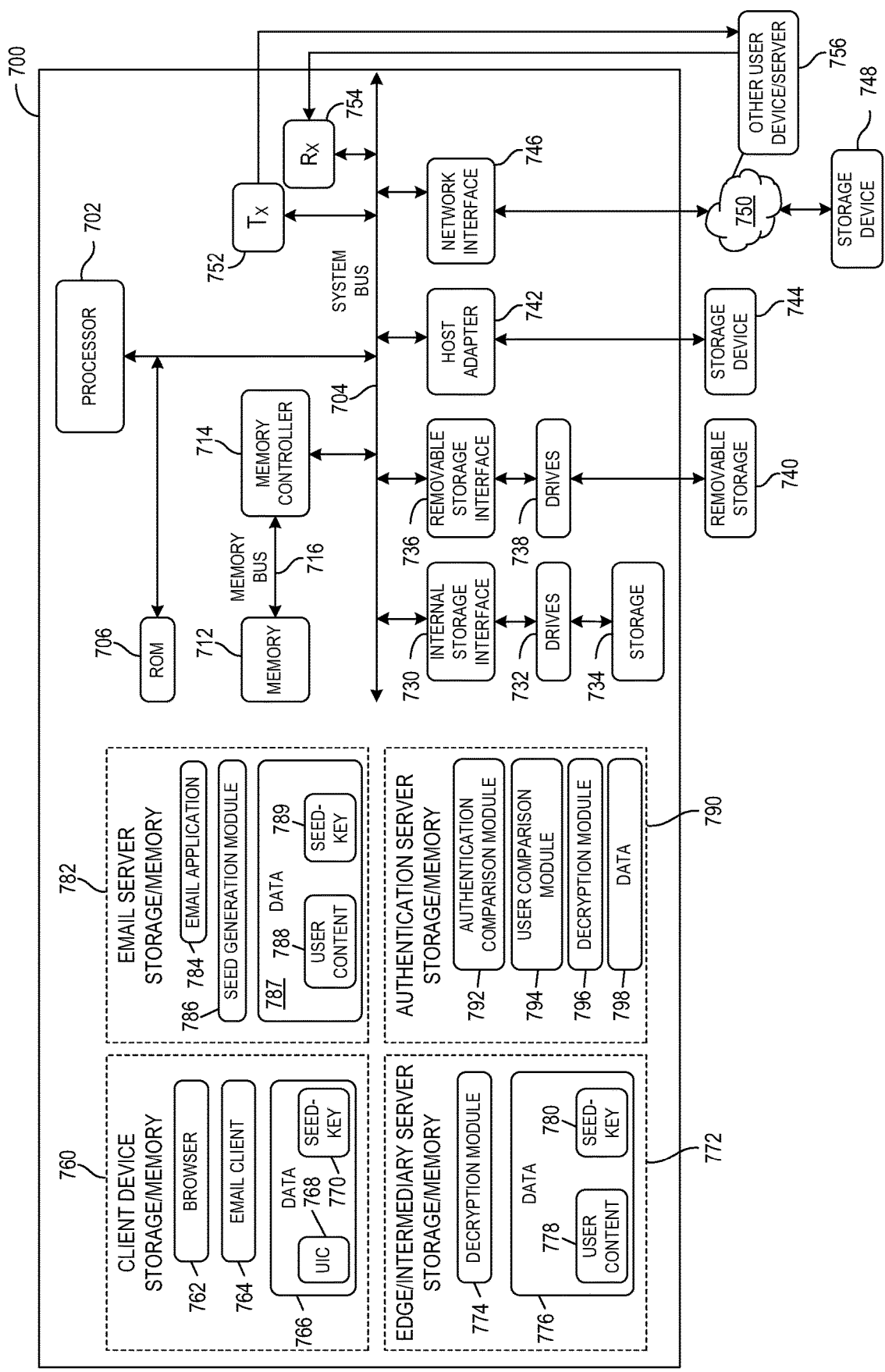
FIG. 7 depicts a representative computing system in which principles described herein may be implemented.

FIG. 7 depicts a representative computing device/system 700 in which principles described herein may be implemented. The representative computing system 700 can represent any of the computing/communication devices described herein, such as, for example, an email server, authentication server, edge server or other intermediary network node, user device, etc., with representative differences noted below. The computing environment described in connection with FIG. 7 is described for purposes of example, as the structural and operational disclosure for migrating user-specific content towards the content consumer is applicable in any environment in which user content may be communicated. It should also be noted that the computing arrangement of FIG. 7 may, in some embodiments, be distributed across multiple devices.

For both client devices and servers, the representative computing system 700 may include a processor 702 coupled to numerous modules via a system bus 704. The depicted system bus 704 represents any type of bus structure(s) that may be directly or indirectly coupled to the various components and modules of the computing environment. A read only memory (ROM) 706 may be provided to store firmware used by the processor 702. The ROM 706 represents any type of read-only memory, such as programmable ROM (PROM), erasable PROM (EPROM), or the like.

The host or system bus 704 may be coupled to a memory controller 714, which in turn is coupled to the memory 712 via a memory bus 716. The operational modules associated with the principles described herein may be stored in and/or utilize any storage, including volatile storage such as memory 712, as well as non-volatile storage devices. FIG. 7 illustrates various other representative storage devices in which applications, modules, data and other information may be temporarily or permanently stored. For example, the system bus may be coupled to an internal storage interface 730, which can be coupled to a drive(s) 732 such as a hard drive. Storage 734 is associated with or otherwise operable with the drives. Examples of such storage include hard disks and other magnetic or optical media, flash memory and other solid-state devices, etc. The internal storage interface 730 may utilize any type of volatile or non-volatile storage.

Similarly, an interface 736 for removable media may also be coupled to the bus 704. Drives 738 may be coupled to the removable storage interface 736 to accept and act on removable storage 740 such as, for example, floppy disks, optical disks, memory cards, flash memory, external hard disks, etc. In some cases, a host adaptor 742 may be provided to access external storage 744. For example, the host adaptor 742 may interface with external storage devices via small computer system interface (SCSI), Fibre Channel, serial advanced technology attachment (SATA) or eSATA, and/or other analogous interfaces capable of connecting to external storage 744. By way of a network interface 746, still other remote storage may be accessible to the computing system 700. For example, wired and wireless transceivers associated with the network interface 746 enable communications with storage devices 748 through one or more networks 750. Storage devices 748 may represent discrete storage devices, or storage associated with another computing system, server, etc. Communications with remote storage devices and systems may be accomplished via wired local area networks (LANs), wireless LANs, and/or larger networks including global area networks (GANs) such as the Internet.

User devices, network services, authentication servers, edge servers and other intermediary network nodes can communicate information as described herein. Communications between user devices and server devices can be effected by direct wiring, peer-to-peer networks, local infrastructure-based networks (e.g., wired and/or wireless local area networks), off-site networks such as metropolitan area networks and other wide area networks, global area networks, etc. A transmitter 752 and receiver 754 are shown in FIG. 7 to depict the representative computing system's structural ability to transmit and/or receive data in any of these or other communication methodologies. The transmitter 752 and/or receiver 754 devices may be stand-alone components, may be integrated as a transceiver(s), may be integrated into or already-existing part of other communication devices such as the network interface 746, etc.

As computing system 700 can be implemented at a user device, email server, authentication server, edge server, etc., block 756 represents the other devices/servers that communicate with the communicating system 700 when it represents one of the devices/servers. In addition to operating systems and other software/firmware that may be implemented in each of the user devices, email servers, authentication servers, edge servers, etc., each may include software modules operable by the processor 702 executing instructions. Some representative modules for each of a number of representative devices/servers are described below.

When the computing system 700 represents a user or client device, the client device storage/memory 760 represents what may be stored in memory 712, storage 734, 740, 744, 748, and/or other data retention devices of a client device such as a computer, smartphone, laptop computer, etc. The representative client device storage/memory 760 may include an operating system (not shown), and processor-implemented functions represented by functional modules. For example, a browser 762 and/or email client 764 may be provided. Data 766 may also be stored, such as the UIC 768, seed-key 770, etc.

Where the representative computing system 700 represents an edge server or other intermediary server as described herein, the memory 712 and/or storage 734, 740, 744, 748 may be used to store programs and data used in connection with the server's functional operations previously described. The server storage/memory 772 represents what may be stored in memory 712, storage 734, 740, 744, 748, databases, and/or other data retention devices. The representative server storage/memory 772 may include an operating system (not shown), a decryption module 774, data 776 such as the cached user content 778 and seed-key 780, etc.

Where the representative computing system 700 represents an email server or other network service as described herein, the memory 712 and/or storage 734, 740, 744, 748 may be used to store programs and data used in connection with the server's functional operations previously described. The server storage/memory 782 represents what may be stored in memory 712, storage 734, 740, 744, 748, databases, and/or other data retention devices. The representative server storage/memory 782 may include, for example, an operating system (not shown), an email application 784, seed generation module 786, as well as data 787 such as the stored user content 788, seed-key 789, etc.

Where the representative computing system 700 represents an authentication server as described herein, the memory 712 and/or storage 734, 740, 744, 748 may be used to store programs and data used in connection with the server's functional operations previously described. The server storage/memory 782 represents what may be stored in memory 712, storage 734, 740, 744, 748, databases, and/or other data retention devices. The representative server storage/memory 790 may include, for example, an operating system (not shown), and modules described in connection with FIG. 3 such as an authentication comparison module 792, user comparison module 794, decryption module 796, data 798, etc.

As previously noted, the representative computing system 700 in FIG. 7 is provided for purposes of example, as any computing device having processing and communication capabilities can carry out the functions described herein using the teachings described herein. It should also be noted that the sequence of various functions in the flow diagrams or other diagrams depicted herein need not be in the representative order that is depicted unless otherwise noted.

As demonstrated in the foregoing examples, methods are described that can be executed on a computing device, such as by providing software modules that are executable via a processor (which includes a physical processor and/or logical processor, controller, etc.). The methods may also be stored on computer-readable media or other storage that can be accessed and read by the processor and/or circuitry that prepares the information for processing via the processor. For example, the computer-readable media may include any digital storage technology, including memory 712, storage 734, 740, 744, 748, any other volatile or non-volatile digital storage, etc. Having instructions stored on a computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A computer-implemented method of transferring authentication-based content to a requesting computer located at a first location, the method comprising:
   storing authentication-based content via a first computer located at a second location remote from the first location;
   receiving, at the first computer and from the requesting computer, user credentials as part of a login process;
   while the login process is being performed and before the login process has been completed, transmitting from the first computer at least a portion of the authentication-based content to an edge computer located at a third location different from the first and second locations;
   authenticating, via the first computer, the user credentials; and
   after authenticating the user credentials, instructing the edge computer to provide the at least a portion of the authentication-based content to the requesting computer.

2. The method of claim 1, wherein the requesting computer located at the first location is closer in proximity to the edge computer located at the third location than the first computer at the second location.

3. The method of claim 1, wherein the portion of the authentication-based content is a first page of a web-based email inbox.

4. The method of claim 1, wherein storing authentication-based content via the first computer located at the second location further includes the first computer receiving, from the requesting computer located at the first location, a seed containing at least a data cluster name, a seed globally unique identifier, and a client identifier.

5. The method of claim 4, wherein the seed is generated based on a cookie stored at the requesting computer.

6. The method of claim 4, wherein receiving, at the first computer and from the requesting computer, the user credentials further includes decrypting the seed to get the cluster name, the seed globally unique identifier, and the client identifier.

7. The method of claim 6, wherein authenticating, via the first computer, the user credentials further includes determining a user is authenticated based on the decrypted client identifier.

8. The method of claim 1, wherein transmitting the at least a portion of the authentication-based content to the edge computer may occur while the user credentials are being entered.

9. A computer-implemented method of transferring authentication-based content to a requesting computer located at a first location, the method comprising:

receiving from the requesting computer a user identification cookie at a first computer located at a second location remote from the first location during a login process;

transmitting from the first computer, in response to the user identification cookie, at least a portion of the authentication-based content to an edge computer located at a third location different from the first and second location during the login process and before the login process has been completed;

receiving, at the first computer and from the requesting computer, user credentials as part of the login process;

authenticating, via the first computer, the user credentials; and after authenticating the user credentials, instructing the edge computer to provide the at least a portion of the authentication-based content to the requesting computer.

10. The method of claim 9, wherein the requesting computer located at the first location is closer in proximity to the edge computer located at the third location than the first computer at the second location.

11. The method of claim 9, wherein the user identification cookie includes at least an identification of the user and a location where user data is stored.

12. The method of claim 9, wherein a seed is generated based on a URL entered by the user.

13. The method of claim 12, wherein the seed is an encrypted structure containing at least a data cluster name, a seed globally unique identifier, and a client identifier.

14. The method of claim 13, wherein receiving, at the first computer and from the requesting computer, the user credentials further includes decrypting the seed to get the cluster name, the seed globally unique identifier, and the client identifier.

15. The method of claim 14, wherein authenticating, via the first computer, the user credentials further includes determining the user is authenticated based on the decrypted client identifier.

16. A system including hardware computing devices configured to transfer authentication-based content, the system comprising:

a first computing device at a first location configured to receive a requesting signal from a second computing device at a second location during a login process at the second computing device; and a third computing device at a third location configured to receive a portion of authentication-based content from the first computer upon the first computer receiving the requesting signal while the login process is being performed and before the login process is completed;

wherein the portion of authentication-based content is transmitted from the third computing device to the second computing device upon the first computing device authenticating user credentials of the second computing device.

17. The system of claim 16, wherein the third location is closer in proximity to the second location than the first location.

18. The system of claim 16, wherein the portion of the authentication-based content is a first page of a web-based email inbox.

19. The system of claim 16, wherein the requesting signal includes at least one cookie indicating an identification of the user and a user data location.

20. The system of claim 19, wherein the cookie is stored on the second computing device.

* * * * *